Patented Mar. 7, 1950

2,499,676

UNITED STATES PATENT OFFICE 2,499,676

DENTAL IMPRESSION MATERIAL

Lloyd T. Parr and Samuel B. Rabishaw, Chicago, Ill.

No Drawing. Application August 21, 1945, Serial No. 611,920

1 Claim. (Cl. 18—47)

The present invention pertains to impression materials for producing accurate reproductions of objects, and more particularly to materials for taking dental impressions.

The principal object of the invention is to produce a dental impression material of such consistency as to facilitate the production of more precise dentures.

Where comfort, appearance, and function require that the denture should precisely fit the mouth it is absolutely necessary to produce impressions with materials whose ingredients are conducive to proper combination to create more effective molds.

In the field of dentistry there has been the problem of inaccurate and inefficient materials for taking impressions of the teeth. Plaster of Paris was used for many years, but this had many disadvantages. It was not only unpleasant to the patient, but also, after the impression had set in the mouth it was difficult or impossible to remove the impression without damage, with a resultant reconstruction of doubtful accuracy. More recently, impression materials of agar were introduced, and although it was an improvement, there was nevertheless, some distortion due to uncontrolled factors. Moreover, with the agar impression materials, which were time consuming in preparation, there is the ever present danger of burning the mouth of the patient. Due to the wartime shortage of agar, there were developed impression materials of the alginate type. These, too, have been an improvement, yet they have shown inadequacies.

In the practice of the present invention, crystalline sorbitol, mannitol, or dextrose has been incorporated into an alginate impression material so as to delay the dehydration, and control dimensional change, of the finished impression. Heretofore, available impression materials of the dry powder alginate type were composed mainly of a jelling agent (alginate), a gel retarder (trisodium phosphate), a gel accelerator (calcium sulphate), and an inert filler. These chemicals, when properly balanced and mixed with water, set to form a flexible gel. After the calcium sulphate had reacted with the water-soluble alginate to form calcium alginate, this gel would lose water by evaporation when exposed to air, or imbibe water by immersion. In either event, the dimensional accuracy is changed to such an extent that the positive cast made therefrom is an inaccurate one.

It is well known that the loss of moisture from products of this type can be controlled by the incorporation of a plasticizer, or water-holding agent, such as glycerine. But, heretofore, it has not been possible to package a product of this type commercially in dry powder form.

Crystalline sorbitol, mannitol or dextrose in dry powdered form can be mixed and packaged with the dry powdered alginate type impression materials, and when mixed with water will dissolve to form a plasticizing or water-holding agent, which will control evaporation and will greatly reduce or prevent dimensional inaccuracy caused by evaporation.

The following is a formula using a plasticizer of the above mentioned type to control the loss of water by evaporation, and thus to maintain the moisture at a constant level. The following formula illustrates the incorporation of both a plasticizer and an active filler. The ingredients thereof are finely powdered and mixed to a homogeneous mass:

|   | Per cent |
|---|---|
| Trisodium phosphate | 2.40 |
| Potassium (water-soluble) alginate | 8.61 |
| Crystalline sorbitol | 23.00 |
| Calcium sulphate | 8.61 |
| Starch (active filler) | 57.38 |
|   | 100.00 |

This entire mass is then mixed with water that is at room temperature in sufficient amount to form a paste by stirring and working the mixture rapidly with a spatula for a predetermined length of time, thus maintaining in paste form the homogeneity of the powder. The mass is then ready for insertion into the patient's mouth and is placed in a suitable impression tray, carried to the mouth and seated in position. In a few minutes after the mass is placed in the mouth, it gels to a solid which is sufficiently elastic to withdraw from undercuts, etc. without permanent distortion.

The mass after gelling does not adhere to the mouth or teeth, and a replica or stone cast of the mouth is obtained by casting any of the several artificial stone products on the market into the impression, the artificial stone in powdered form being first formed, of course, into a suitable paste. In the above formula, the crystalline sorbitol serves as the plasticizer, and the starch acts as the active filler.

With the above formula, a balance of moisture is maintained between the impression material and the stone material, thereby imparting to the replica or stone cast of the mouth a smooth and durable and tough surface of fine texture, a result not heretofore achieved with similar products.

By using both the plasticizer (crystalline sorbitol, mannitol, dextrose, etc.) and an active filler (starch) we have discovered that it is possible to control dimensional change and increase flexibility which will prevent dimensional distortion.

In addition to the use of starch as an active filler, there are other fillers which can be used, which also actively enter into the formation of the gel, thereby increasing the strength and reducing dimensional change due to evaporation. Fillers of this type would include the water-soluble gums such as karaya, acacia, locust bean, tragacanth and pectin. In addition to the natural gums, materials such as hide glue, gelatine, and polyvinyl-alcohol, when used as fillers, also enter actively into the formation of a strong and stable gel. In general, colloids which are water-soluble or exhibit water-holding properties, having a pH no lower than 4.5 and no higher than 10.0 and which are non-reactive to calcium and trisodium phosphate, may also be used.

While we have described our invention in relation to its application in dental science, we do not intend so to limit its use, but rather to extend its application to all cases where a resilient, accurate impression material may be of utility.

What we claim is:

Material for taking impressions comprising trisodium phosphate, potassium alginate, crystalline sorbitol, calcium sulphate and starch.

LLOYD T. PARR.
SAMUEL B. RABISHAW.

REFERENCES CITED

The following references are of record in the file of this patent:

UNITED STATES PATENTS

| Number | Name | Date |
|---|---|---|
| 1,194,176 | Healy | Aug. 8, 1916 |
| 1,897,034 | Harrison | Feb. 14, 1933 |
| 2,158,485 | Preble | May 16, 1939 |
| 2,165,680 | Staugenbury et al. | July 11, 1939 |
| 2,249,694 | Wilding | July 15, 1941 |
| 2,359,512 | Dickson et al. | Oct. 3, 1944 |